Sept. 5, 1933.  E. W. BAYES  1,925,581
SAFETY SHUT-OFF FOR LOCOMOTIVES
Filed July 18, 1932  2 Sheets-Sheet 1
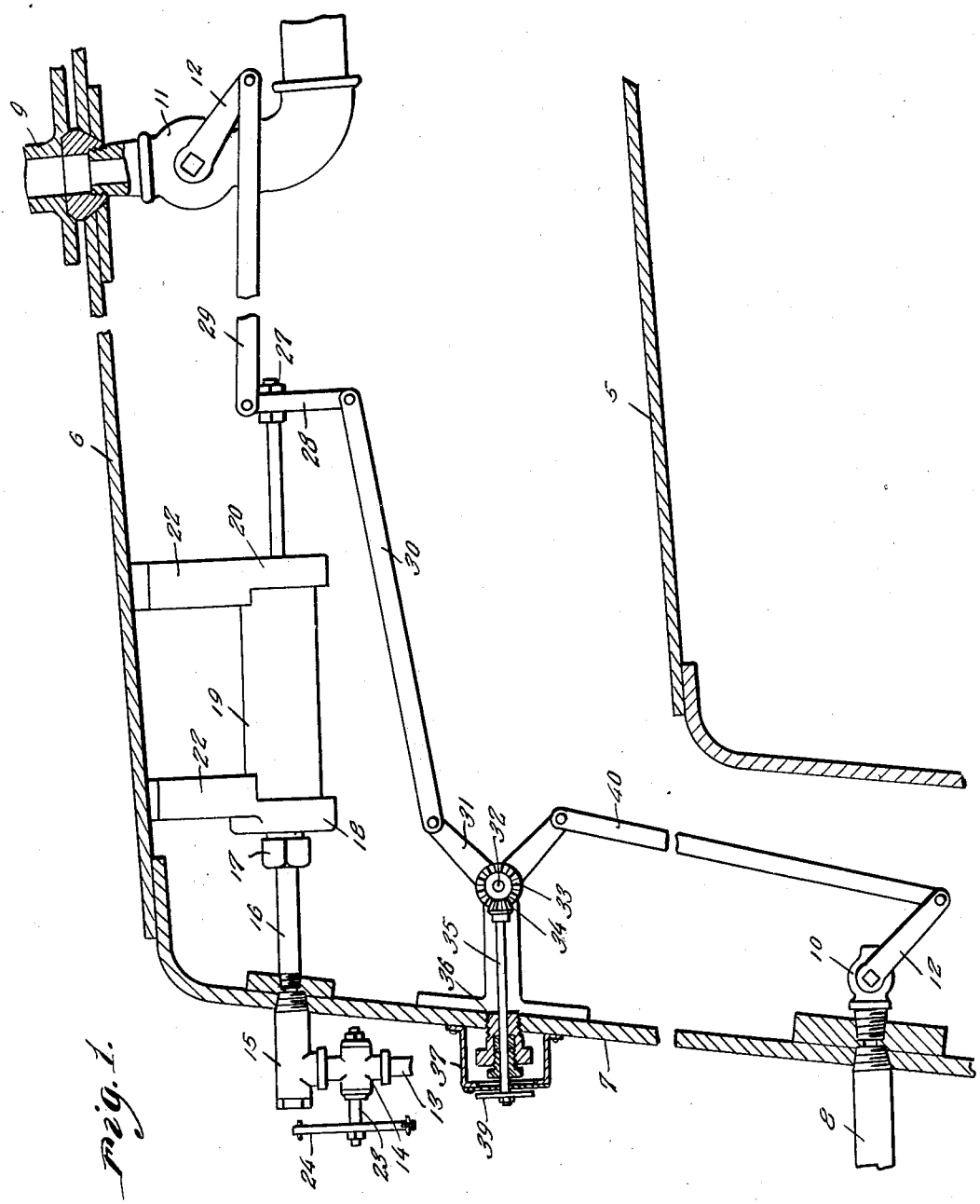
Inventor
E. W. Bayes
By Clarence A. O'Brien
Attorney Sept. 5, 1933.  E. W. BAYES  1,925,581
SAFETY SHUT-OFF FOR LOCOMOTIVES
Filed July 18, 1932  2 Sheets-Sheet 2
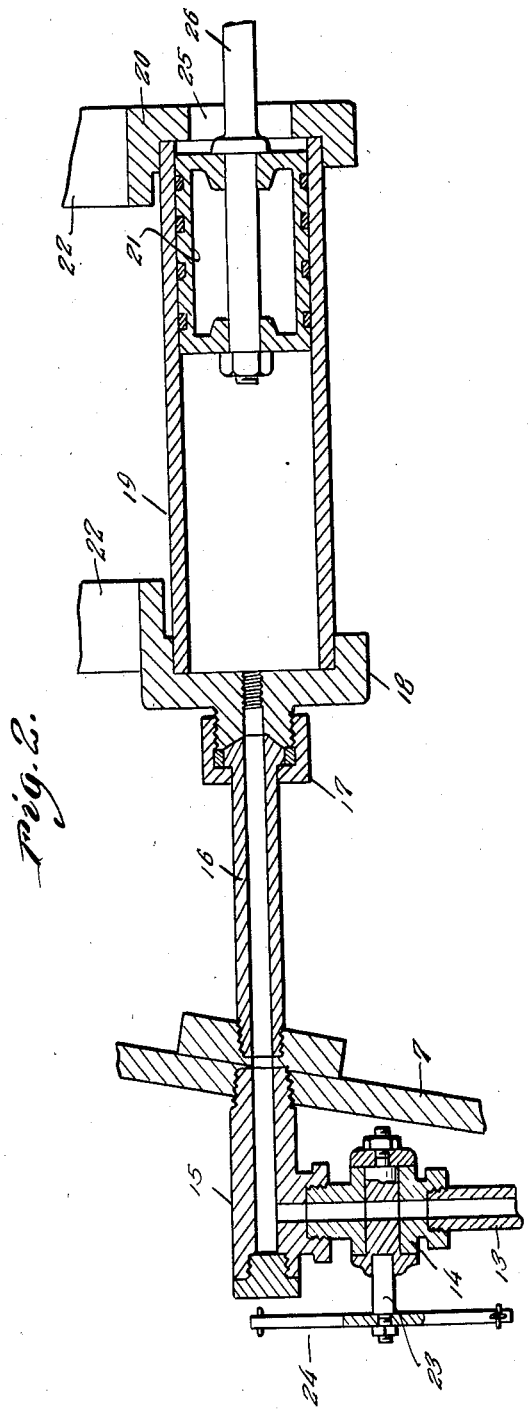
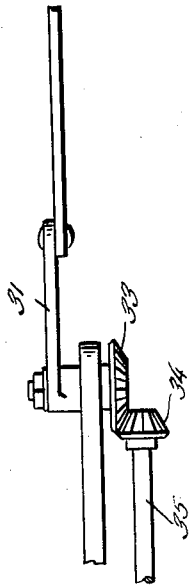
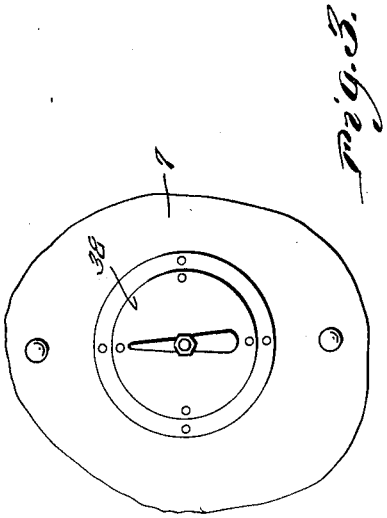
Inventor
E. W. Bayes
By Clarence A. O'Brien
Attorney Patented Sept. 5, 1933

1,925,581

UNITED STATES PATENT OFFICE 1,925,581

SAFETY SHUT-OFF FOR LOCOMOTIVES

Elijah W. Bayes, Parsons, Kans.

Application July 18, 1932. Serial No. 623,306

3 Claims. (Cl. 246—169)

This invention relates to new and useful improvements in automatic safety devices for locomotives and more particularly shutting off the steam lines in a locomotive cab in an emergency.

This device is particularly adapted for locomotive boilers for the reason that usually when a wreck occurs, one or more pipes are broken in the cab of the locomotive and quite often members of the crew are trapped in the cab and scalded to death or suffocated by the steam when otherwise they would have escaped with their lives with possibly minor injuries.

An important object of the invention is to provide an automatic shut-off mechanism which will function automatically to shut off escaping steam in the cab of a locomotive.

These and various other advantages and objects of the invention will become apparent to the reader of the following specification.

In the drawings:—

Figure 1 represents a vertical sectional view through a boiler structure showing the mechanism installed thereon.

Fig. 2 represents a fragmentary detailed sectional view through the cylinder of the mechanism.

Fig. 3 represents a fragmentary front elevational view of the indicator.

Fig. 4 represents a fragmentary top plan view of the indicator operating means.

Referring to the drawings wherein like numerals designate like parts, it can be seen that in the boiler structure, numeral 5 represents the crown sheet while above this numeral 6 represents the wrapper sheet, while toward the left in Fig. 1 numeral 7 represents the back head of the conventional boiler structure.

As is clearly shown in Fig. 1, numerals 8—9 represent steam distribution pipes in which valves 10 and 11 respectively are installed. Each of these valves 10 and 11 is equipped with a crank handle 12.

Numeral 13 represents a compressed air line such as is used on locomotives for the brake system etc., and as is clearly shown in Fig. 2, a valve 14 is installed between the upper end of this compressed air pipe 13 and the fitting 15 which is screwed into the back head 7 and communicates with the conduit 16 which is connected as at 17 to the head 18 of the cylinder 19.

Numeral 20 represents an abutment, at the opposite end of the cylinder 19 for stopping the piston 21 which operates in the cylinder 19 and members 22—22 extend upwardly from the head 18 and abutment 20 and are secured to the sheets 6 as shown in Fig. 1.

Let it be assumed that the air supply pipe has been accidentally broken and the engine is still on the track and able to operate except for the fact that the mechanism has shut off the steam cocks. This is repaired by simply removing the nut from the outer end of the fitting 15 and inserting a long threaded rod or bolt therein and screwing the same inwardly until it engages and retains the piston in the position shown in Fig. 2.

The valve 14 is operated by a shaft 23 which has a lever 24 thereon whereby the valve can be operated. This lever 24 normally assumes a vertical position and the same has a chain bracket (not shown) extending from each end thereof and in opposite directions to attach to the inside of the cab at remote points, so that the valve shaft 23 can be conveniently operated by either the engine or fireman. Extending from the piston 21 and through the opening 25 in the abutment 20 is the connecting rod 26 which connects as at 27 to the vertically extending member 28 to the upper end of which is pivotally connected one end of the link member 29, the opposite end of the link member being pivotally connected to the free end of the crank 12 of the valve 11.

To the opposite end of the vertical member 28 is pivotally connected one end of the link 30, while the opposite end of the link 30 is connected to the upper end of the ball crank 31, the bell crank being rigidly secured to the shaft 32 which carries a beveled gear 33 in mesh with the beveled pinion 34, the latter being located on the shaft 35 and operating through a packing gland 36 in the back head 7. The packing gland 36 is mounted in the casing 37 which has a dial 38 on the outer end thereof with a suitable scale of indicating data thereon, the outer end of the shaft 35 being equipped with a pointer 39, complementary to the dial 38.

Numeral 40 represents a third link the upper end of which is pivotally connected to the lower end of the ball crank 31 while the lower end of the link member 40 is pivotally connected to the crank 12 of the valve 10.

It can now be seen, that ordinarily the pressure of the air line 13 will maintain the piston 21 in the position shown in Fig. 2, in which position, the valves 10 and 11 are maintained in open position. This is because of the pressure of air confined with the leverage between the rod 26 and the valves 10 and 11.

However, when the air pipe 13 becomes ruptured and air pressure is lost from the back end of the cylinder 19, the steam pressure against the piston 21 forces the piston toward the left in Fig. 2 and as shown in Fig. 1, the link arrangement will function to close both of the valves 10 and 11, thus shutting off the steam from the boiler so that no steam can escape to do harm to persons that may be trapped in the cab as during a wreck.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

1. In combination, a boiler, a cylinder provided with a piston, said cylinder being open at one end and mounted within the boiler, a brake air supply line communicating with the cylinder at its opposite end, a steam outlet conduit having a valve therein, and a connection between the valve and the piston whereby the valve is closed when the piston is actuated by the steam pressure of the boiler.

2. In combination, a boiler, a cylinder provided with a piston, said cylinder being open at one end and mounted within the boiler, a brake air supply line communicating with the cylinder at its opposite end, a steam outlet conduit having a valve therein, and a connection between the valve and the piston whereby the valve is closed when the piston is actuated by the steam pressure of the boiler, said valve and connection being located within the said boiler.

3. In combination, a boiler, a cylinder communicating at one end with the boiler and being open at its opposite end, a piston operative in the cylinder, a steam outlet conduit extending from the boiler and having a valve therein, a connection between the valve and the piston whereby the valve is closed when the piston responds to the steam pressure of the boiler, an indicator shaft extending through the boiler wall and having an indicator hand on its outer end, a rockable shaft, drive means between the rockable shaft and the indicator shaft, a lever extending from the said rockable shaft and a connection between the lever and the said piston whereby the indicator shaft is moved to indicate the position of the piston when the piston is actuated.

ELIJAH W. BAYES.